April 2, 1940.    J. F. THOLL    2,195,710
CENTRIFUGAL SEPARATOR
Filed Nov. 23, 1936
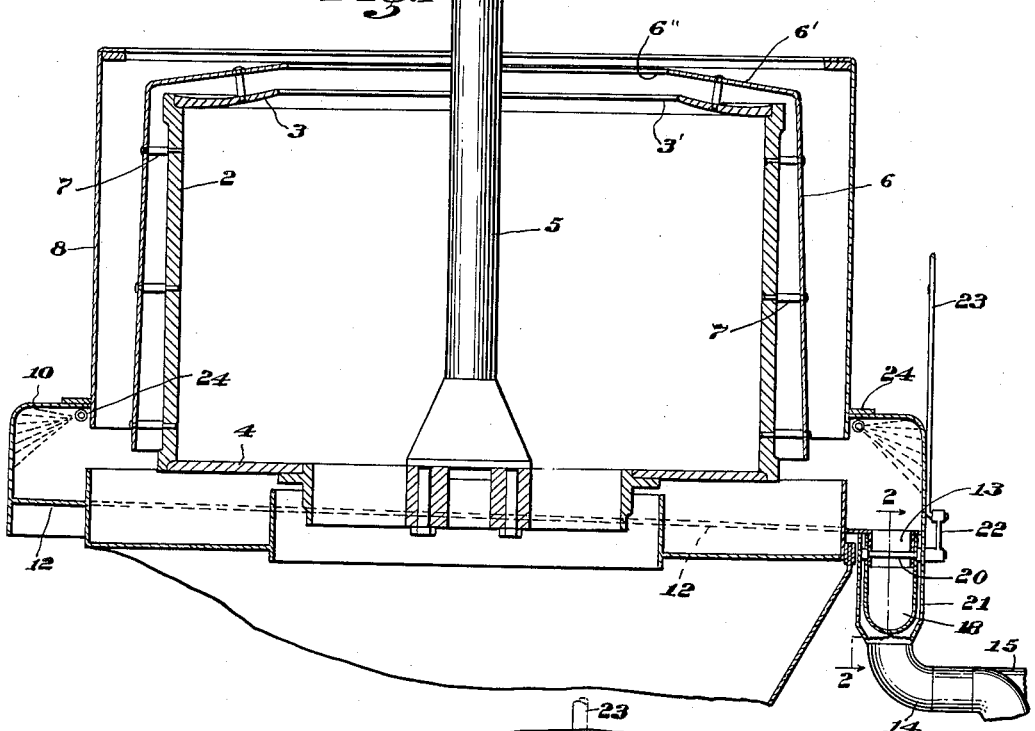
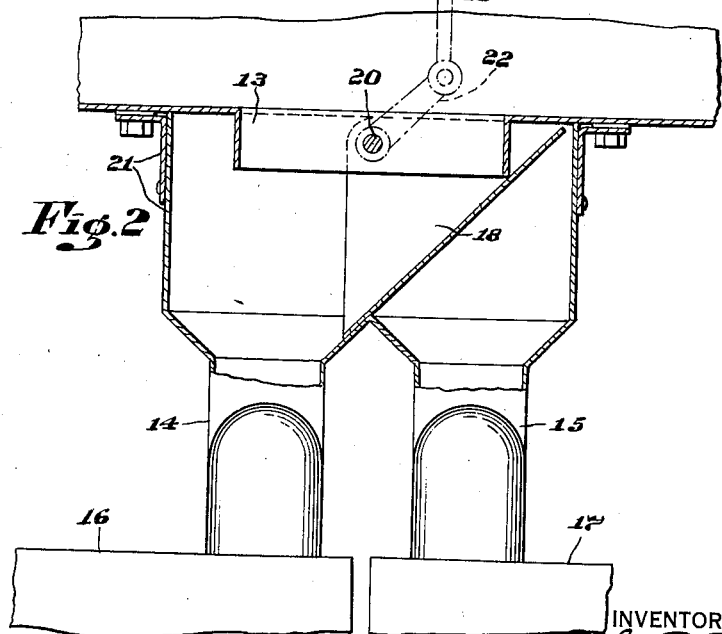
INVENTOR
John F. Tholl,
BY
ATTORNEY.

Patented Apr. 2, 1940

2,195,710

UNITED STATES PATENT OFFICE 2,195,710

CENTRIFUGAL SEPARATOR

John F. Tholl, Needham, Mass., assignor to American Tool & Machine Co., Hyde Park (Boston District), Mass., a corporation of Massachusetts Application November 23, 1936, Serial No. 112,349

2 Claims. (Cl. 233—21)

This invention relates to centrifugal separators, and more especially to the construction of the baskets used in such separators.

In the treatment of some materials by the centrifugal process, the nature of the liquid discharge from the basket against the inner wall of the surrounding casing or curb sheet is such that it is difficult to clean the curb sheet by the usual washing apparatus with which such machines customarily are equipped. The present invention deals particularly with this problem and aims to devise a construction in which the process of cleaning a centrifugal will be facilitated.

The nature of the invention will be readily understood from the following description when read in connection with the accompanying drawing, and the novel features will be particularly pointed out in the appended claims.

In the drawing,

Figure 1 is a vertical, sectional view of a centrifugal basket and the parts immediately associated therewith, this organization being constructed in accordance with the present invention;

Fig. 2 is a vertical, sectional view approximately on the line 2—2, Fig. 1.

Referring first to Fig. 1, the construction there shown comprises a centrifugal basket 2 which may be of any suitable nature, that shown including the usual cylindrical wall or main body portion with top and bottom members 3 and 4, respectively, welded thereto. This centrifugal is of the suspended type, the basket being secured to the lower end of a vertical shaft 5 for rotation about its own axis.

According to the present invention the basket is encircled by a shell 6, concentric with the basket and tapering from top to bottom. A series of spacing studs, such as those shown at 7, riveted or welded to the wall of the basket and also to the shell, secure the latter member rigidly to the basket in spaced relationship thereto and for rotation therewith.

Preferably the shell is provided with a collar portion 6' extending inwardly over the top of the basket and terminating at an inner annular edge 6" located considerably above and preferably somewhat closer to the axis of the basket than the corresponding edge 3' of the basket top.

This basket with its shell may be mounted in the usual curb or casing 8, but preferably the lower portion of the casing is equipped with a supplemental curb 10 positioned directly opposite and surrounding the lower edge of the shell 6 where it will receive the material discharged from the shell.

In using an apparatus of this type as, for example, in treating sludges or slurries, to clarify them, or to effect a separation of the solid and liquid constituents for any reason, it is a common practice to feed the material into the basket while the latter is revolving and to continue this operation until the liquid constituent overflows the edge 3', the solid constituents in the meantime accumulating on the inner wall of the basket. The liquids discharged over the edge 3' are thrown against the inner surface of the shell 6 and flow downwardly along said surface under the action of centrifugal force, finally being discharged from the lower edge of the shell. Similarly, if the basket is of a perforated type, the liquid discharged from it strikes the inner surface of the shell and is discharged in the same way from the lower edge of the latter. In either event, it is here subjected to a strong centrifugal action effective to create a flow and a consequent discharge of it, whereas the same accumulation on the inner wall of the stationary curb sheet 8 would not be subjected to any such action.

This liquid runs down the walls of the supplemental curb sheet and around the inclined gutter 12 to an outlet 13, best shown in Fig. 2. Provision is made for washing the walls of this supplemental curb, and as either the liquid discharge from the basket, or the washings, flow through the outlet 13, they may be delivered into either of two conduits 14 or 15 which conduct it to sumps 16 or 17, respectively, or to any other desired points. One of these sumps is designed to receive the centrifugal liquid and the other the washings, and the operator or machine tender can control the flow into one or the other by means of a flapper valve 18.

This valve is of approximately U-shape in transverse section, as shown in Fig. 1. It has a straight bottom and parallel sides of approximately triangular outline. A rock shaft 20, fulcrumed partly in the upright walls of the outlet 13 and partly, also, in the surrounding header 21, is welded, or otherwise secured rigidly, to the upper corner portions of the valve. Outside the header 21 an arm 22 is secured rigidly to the rock shaft and a control rod 23 is pivoted to the end of this arm, this rod running to any desired location within convenient reach of the operator. As shown in Fig. 3, the valve 18 directs all of the flow from the spout 13 into the conduit 14, but when the rod 23 is pushed downwardly, it rotates both the rock shaft 20 and the valve 18 in a clockwise direction, thus tipping the valve into position to divert all the flow from the outlet 13 into the conduit 15. Consequently, when the charge of solids has been unloaded from the basket, and the operator turns water into the spray pipe 24 to wash the walls of the supplemental curb 10, he also shifts the position of the flapper valve 18 to divert the washings into the proper conduit. Any of the common or other suitable spray structures may be mounted inside the basket, if desired, to wash its walls. Preferably the spray pipe 24 is located behind the lower margin of a casing 8 so that it is protected from the material discharge from the lower edge of the shell 6.

It will be observed that in this arrangement the surface of the shell 6 which initially receives the liquid discharged from the basket, is revolved in unison with the basket and consequently, this liquid material is kept moving and does not collect on the surface of the shell to any great depth. At the same time the inner surface of the curb sheet is always kept substantially free from such liquid, and the only areas on which the discharged liquid collects are the wall of the supplemental curb and the surface of the gutter 12. Consequently, the area from which such liquid must be washed is greatly reduced, this operation is made correspondingly simple, and the washings may be readily separated from the liquid to be conserved, if that is desirable. This arrangement also is of advantage in handling slurries or sludges containing liquids of a volatile nature since it affords much better control of the liquid phase of the mixture, and greatly reduces the creation of a mist or vapor around the machine when it is in operation. A corresponding reduction in evaporation of the volatile liquid also is realized.

While I have herein shown and described a typical embodiment of my invention, it will be understood that the invention may be embodied in other forms without departing from the spirit or scope thereof.

Having thus described my invention, what I desire to claim as new is:

1. The combination of a centrifugal separator basket having an annular top portion extending inwardly toward the axis thereof, a shell encircling the body portion of said basket and secured thereto to revolve therewith, said shell being tapered from top to bottom and having an annular collar portion extending inwardly over the top of said basket, and spacing studs anchored in said basket and securing said shell in a fixed and spaced relationship to the basket, the upper edge of said collar portion being above the level of the opening in the top of the basket, whereby material discharged centrifugally through said opening will be caught by said shell.

2. The combination of a centrifugal separator basket having an annular top portion extending inwardly toward the axis thereof, a shell encircling the body portion of said basket and secured thereto to revolve therewith, said shell being tapered from top to bottom and having an annular collar portion extending inwardly over the top of said basket, and spacing studs anchored in said basket and securing said shell in a fixed and spaced relationship to the basket, the upper edge of said collar portion being above the level of the opening in the top of the basket, a stationary casing in which said basket and shell are mounted, said casing having a supplemental chamber encircling the lower marginal portion of said shell and constructed and arranged to receive the material discharged therefrom, means for directing water against the wall of said supplemental chamber upon which the material is thrown from said shell to wash said wall, said means being located in the supplemental chamber above the bottom edge of the casing, whereby said means are protected.

JOHN F. THOLL.